US008439310B2

(12) United States Patent  (10) Patent No.: US 8,439,310 B2
Cazals et al.  (45) Date of Patent: May 14, 2013

(54) AIRCRAFT PRESENTING TWO PAIRS OF WINGS AND FUEL TANKS IN FLUID COMMUNICATION

(75) Inventors: Olivier Cazals, Daux (FR); Jaime Genty de la Sagne, Toulouse (FR)

(73) Assignee: Airbus Operations, Toulouse (FR)

( * ) Notice: Subject to any disclaimer, the term of this patent is extended or adjusted under 35 U.S.C. 154(b) by 248 days.

(21) Appl. No.: 12/702,869

(22) Filed: Feb. 9, 2010

(65) Prior Publication Data

US 2010/0200703 A1 Aug. 12, 2010

(30) Foreign Application Priority Data

Feb. 12, 2009 (FR) ...................................... 09 50901

(51) Int. Cl.
B64D 37/02 (2006.01)
B64D 37/04 (2006.01)
B64D 37/12 (2006.01)

(52) U.S. Cl.
USPC ..................................... 244/135 R; 244/45 R

(58) Field of Classification Search ................ 244/45 R, 244/34 A, 91
See application file for complete search history.

(56) References Cited

U.S. PATENT DOCUMENTS

| | | | | |
|---|---|---|---|---|
| 2,147,968 A * | 2/1939 | Delanne | ........................... | 244/13 |
| 2,505,604 A * | 4/1950 | Clark et al. | ................ | 244/135 R |
| 2,665,862 A * | 1/1954 | Grill | ......................... | 244/135 R |
| 3,147,941 A * | 9/1964 | Hawthorne | ................ | 244/135 R |
| 3,834,654 A * | 9/1974 | Miranda | .......................... | 244/13 |
| 3,856,238 A * | 12/1974 | Malvestuto, Jr. | .................. | 244/5 |
| 3,981,460 A * | 9/1976 | Ratony | ............................ | 244/13 |
| 4,053,125 A * | 10/1977 | Ratony | ............................ | 244/46 |
| 4,090,681 A * | 5/1978 | Zimmer | ...................... | 244/45 R |
| 4,146,199 A * | 3/1979 | Wenzel | ....................... | 244/45 R |
| 4,365,773 A | 12/1982 | Wolkovitch | | |
| 4,455,004 A * | 6/1984 | Whitaker, Sr. | ............. | 244/90 R |
| 4,541,593 A * | 9/1985 | Cabrol | ......................... | 244/45 R |
| 4,856,736 A | 8/1989 | Adkins et al. | | |
| 5,046,684 A * | 9/1991 | Wolkovitch | .................... | 244/7 A |
| 5,308,022 A * | 5/1994 | Cronkhite et al. | .......... | 244/3.14 |
| 5,503,352 A * | 4/1996 | Eger | ........................... | 244/45 R |
| 5,899,409 A * | 5/1999 | Frediani | .......................... | 244/13 |
| 5,899,410 A * | 5/1999 | Garrett | ........................ | 244/45 R |
| 6,969,026 B2 * | 11/2005 | Kayama | .......................... | 244/13 |
| 7,073,751 B1 * | 7/2006 | Tighe et al. | ................. | 244/135 C |
| 7,322,546 B2 * | 1/2008 | Snow et al. | ................. | 244/172.3 |
| 7,624,951 B1 * | 12/2009 | Kraft et al. | ................. | 244/199.4 |
| 2006/0108476 A1 * | 5/2006 | Padan | ........................ | 244/135 R |
| 2006/0144991 A1 * | 7/2006 | Frediani | ...................... | 244/45 R |
| 2009/0164122 A1 * | 6/2009 | Morbey et al. | ................ | 701/301 |
| 2009/0182506 A1 * | 7/2009 | Yun | ................................ | 701/301 |
| 2011/0024556 A1 * | 2/2011 | Cazals et al. | ............... | 244/99.12 |

FOREIGN PATENT DOCUMENTS

FR 2 519 934 A1 7/1983

OTHER PUBLICATIONS

Federal Aviation Administration (FAA), Federal Aviation Regulations (FAR), Part 23, Section 1385 (b).*
Boeing, FJ Fury, <http://www.boeing.com/history/bna/fj.htm>.*
D'Shannon Aviation, Tip Tanks, <http://d-shannon-aviation.com/?q=tip-tanks>.*
French Search Report conducted on Sep. 14, 2009 in corresponding French Patent Application No. 09 50901, (with translation).

* cited by examiner

*Primary Examiner* — Tien Dinh
*Assistant Examiner* — Michael A Fabula
(74) *Attorney, Agent, or Firm* — Oliff & Berridge, PLC

(57) ABSTRACT

An aircraft comprises: a fuselage; a front pair of wings; a rear pair of wings; and a pair of bodies, each body interconnecting, at a distance from the fuselage, the front and rear wings that are situated on the same side of the fuselage.

10 Claims, 3 Drawing Sheets

AIRCRAFT PRESENTING TWO PAIRS OF WINGS AND FUEL TANKS IN FLUID COMMUNICATION

BACKGROUND OF THE INVENTION

Aircraft are known that have so-called "tandem" wings, comprising a front pair of wings and a rear pair of wings. Such a configuration presents certain advantages. In particular, it improves lift.

Nevertheless, that configuration presents a few drawbacks. Thus, the wings often present poor aerodynamic efficiency, in particular at their distal ends. Furthermore, that arrangement raises problems of structural rigidity.

OBJECT AND SUMMARY OF THE INVENTION

An object of the invention is to improve the aerodynamic efficiency of wings in such a configuration and also the structural rigidity of the aircraft. To this end, the invention provides an aircraft that comprises:

a fuselage;
a front pair of wings;
a rear pair of wings; and
a pair of bodies, each body interconnecting, at a distance from the fuselage, the front and rear wings that are situated on the same side of the fuselage.

Thus, the presence of the bodies attached to the wings improves their aerodynamics. Depending on circumstances, this improvement may consist in better control over wing tip turbulence or over angular momentum, or indeed greater effectiveness of the controls at the ends of the wings.

Connecting together the front and rear wings by means of the bodies improves the structural rigidity of the aircraft, in particular the twisting and bending behavior of the wings. The bending behavior of the wings that are connected together by the bodies can be further improved by selecting suitable dihedral angles for the wings. The structural architecture that results from the presence of the bodies makes it possible to reduce the weight of the structure.

The presence of the bodies also gives greater flexibility in selecting the shape of the wings, in particular their aspect ratio, their taper, their relative thickness, and the relative positioning of the front and rear wings. This flexibility enables the configuration of the aircraft to be optimized aerodynamically and structurally.

The engines may thus be more easily placed under or over the front wings or the rear wings. The presence of the bodies provides greater flexibility in positioning the engines along the direction Y, i.e. in the horizontal direction perpendicular to the length of the fuselage, with this being achieved by the structural architecture being favorable in teams of wing bending.

The aircraft of the invention may also present at least one of any of the following characteristics:

each body is of streamlined shape;
each body comprises a box;
on each body, the wing portions contiguous to the body are spaced apart from each other;
each body includes at least one appendix;
the bodies form portions of the structure of the aircraft;
each body projects from the wings with which it is associated in at least one of the following directions: forwards; rearwards; upwards; downwards; and away from the fuselage; and preferably in all of said directions;
each body includes a fuel tank;
each body is in communication with a fuel tank in at least one of the wings connected to the body, and preferably in both of the wings;
each body includes at least one electrical, electronic, or hydraulic member such as: a navigation member; a communications member; and a detector member;
one of the pairs of wings, e.g. the front pair, extends from a bottom zone of the fuselage, and the other pair of wings, e.g. the rear pair, extends from a top zone of the fuselage;
each body is connected to the ends of the wings with which it is associated;
at least one of the pairs of wings presents a configuration that is swept, backwardly or forwardly;
the front pair of wings presents a backwardly-swept configuration and the rear pair of wings presents a forwardly-swept configuration;
the aircraft does not have a horizontal tail stabilizer; and
the fuselage presents a rear segment, e.g. of conical or frustoconical shape presenting at least one transverse dimension that tapers rearwards, each pair of wings extending from a zone of the fuselage that is situated in front of the rear segment.

BRIEF DESCRIPTION OF THE DRAWINGS

Other characteristics and advantages of the invention appear further from the following description of a preferred embodiment given by way of non-limiting example and with reference to the accompanying drawings, in which.

MORE DETAILED DESCRIPTION

There follows a description with reference to FIGS. 1 to 5 of an airplane constituting a preferred embodiment of the aircraft of the invention. The aircraft of the invention could nevertheless be of a type other than an airplane. The invention could apply to an aerodyne.

Figure 1:
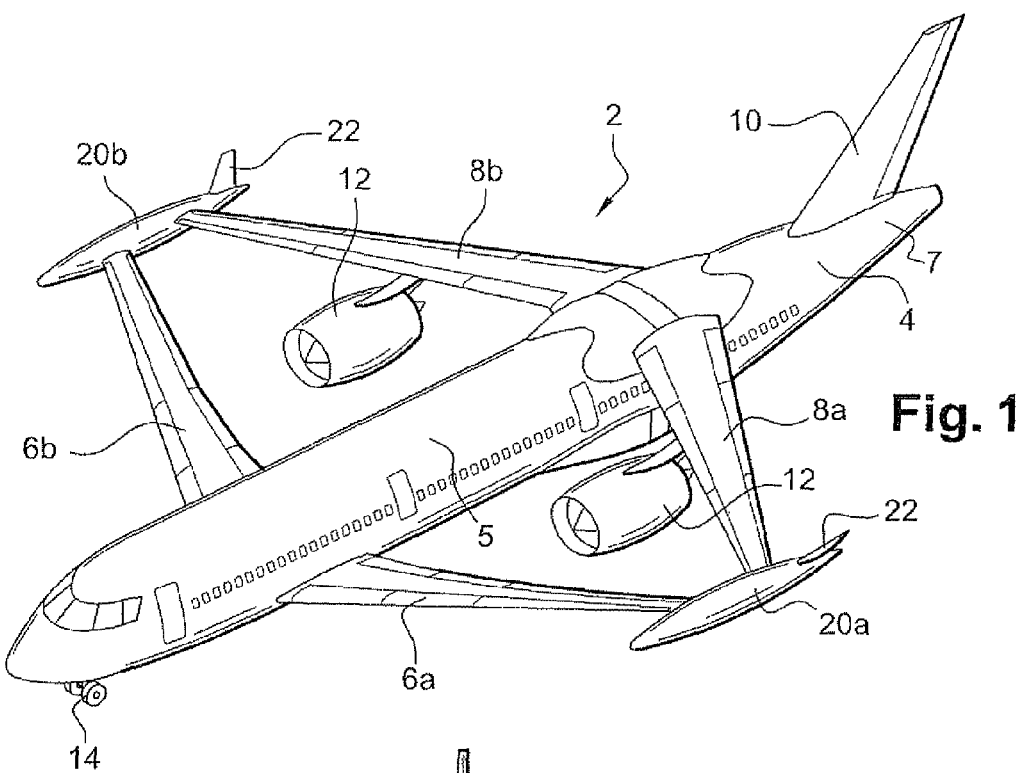
FIG. 1 is a perspective view of an airplane constituting an embodiment of the invention.
Figure 2:
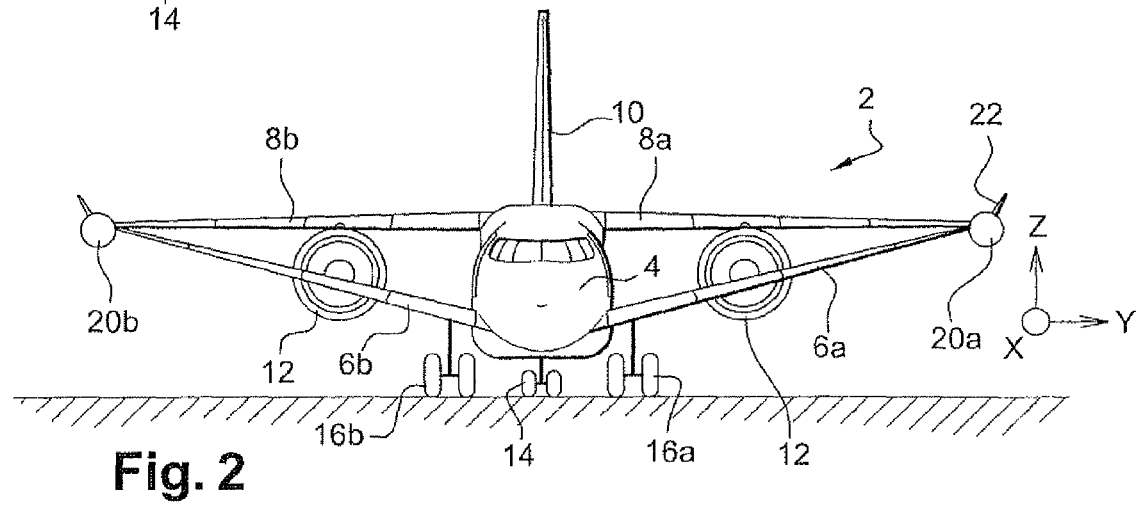
FIGS. 2, 3, and 4 are respectively a front view, a side view, and a view of the underside of the FIG. 1 airplane.
Figure 3:
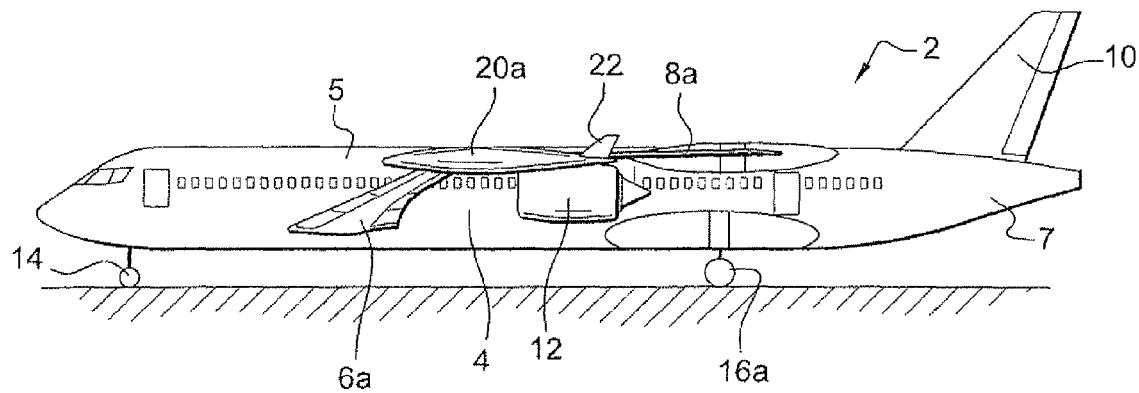

The airplane 2 has a fuselage 4 that is elongate in the longitudinal direction X of the airplane. A conventional frame of reference is used herein, as shown in FIG. 2, in which the direction X is the longitudinal horizontal direction of the fuselage, the direction Y is the horizontal direction perpendicular to the direction X, and the direction Z is the vertical direction.

In the present example, the airplane 1 has a front pair of wings 6a, 6b and a rear pair of wings 8a, 8b. Each of these four wings presents a proximal end attached to the fuselage 4. The front wings 6a, 6b are attached to a low or bottom zone of the fuselage 4, while the rear wings 8a, 8b are attached to a high or top zone of the fuselage.

The fuselage has a main segment 5 of generally cylindrical shape of dimensions in the directions Y and Z that are substantially constant along the segment in the direction X. It also presents a rear segment 7, e.g. of generally frustoconical shape, that forms the rear end zone of the fuselage and that presents transverse dimensions that diminish going rearwards. These dimensions correspond substantially to the diameter of the truncated cone. Each pair of wings extends entirely from a zone of the fuselage situated on the main segment 5 in front of the rear segment 7.

Also in the present example, the front wings 6a, 6b are in a backwardly-swept configuration while the rear wings 8a, 8b are in a forwardly-swept configuration. This means that when going along the front wings from the fuselage, each front wing slopes rearwards. Conversely, when going along one of the rear wings from the fuselage, these wings slope forwards.

Figure 4:
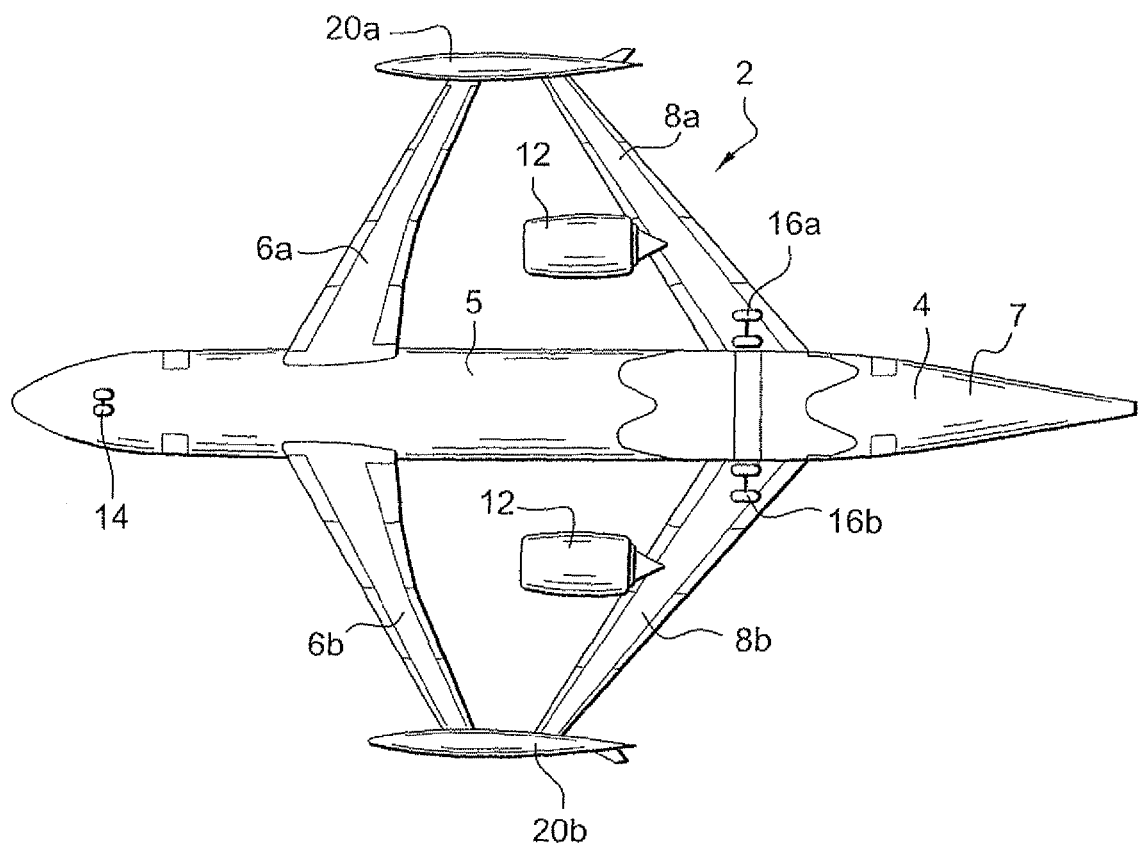

The airplane 2 also has a tail fin or vertical stabilizer 10 extending from a rear zone of the fuselage. It has two engines 12, specifically constituted by thrusters. In the present example, the engines are fastened to the undersides of respective rear wings 8a and 8b. When the airplane is observed from beneath, as shown in FIG. 4, a major portion of each engine lies in front of the rear wings 8a, 8b.

Specifically, the airplane has a front undercarriage 14 extending under a front portion of the fuselage, and two main undercarriages 16a, 16b specifically under the respective rear wings 8a, 8b.

The airplane 2 has two bodies 20a, 20b, each extending at a distance from the fuselage 4. The body 20a is connected to the wings situated on the left of the fuselage, i.e. the front wing 6a and the rear wing 8a. The right body 20b is connected to the wings situated on the right of the fuselage, i.e. the front wing 6b and the rear wing 8b. Specifically, each body 20a, 20b is fastened to the distal ends of the corresponding wings. At each body, the wing portions contiguous with the body are spaced apart from each other, as can be seen in particular in FIGS. 1 and 5.

In the present example, the bodies 20a, 20b are symmetrical to each other about a longitudinal vertical midplane XZ of the airplane. Specifically, and ignoring the appendix described below, each of the bodies is also symmetrical about its own longitudinal midplane. In the present example, each body is a body of revolution about a longitudinal axis parallel to the axis X. In the present example, each body has a streamlined shape. It thus presents tapering front and rear ends.

The wings are fastened to the face of the body that faces towards the fuselage 4. Each body comprises a closed hollow box 30 projecting from the associated wings forwards and rearwards along the direction X, upwards and downwards along the direction Z, and away from the fuselage along the direction Y. In the present example, the greatest dimension of each body, i.e. its length, extends in the direction X.

The shapes of the ends of the wings, the way these ends are connected to the body, and the positioning of these ends relative to the body are preferably determined by improving the aerodynamics of the airplane.

Provision can be made for each body to present at least one appendix. Thus, as shown in the figures (except FIG. 5), there can be seen a stabilizer 22 situated at the rear of the body and sloping away from the fuselage 4, the stabilizer being plane and oriented in such a manner that its plane contains the longitudinal axis of the body. Fitting each body with one or more aerodynamic appendices serves to improve its aerodynamic or aeroelastic behavior. The stabilizer could nevertheless be omitted, as shown in FIG. 5.

Figure 5:
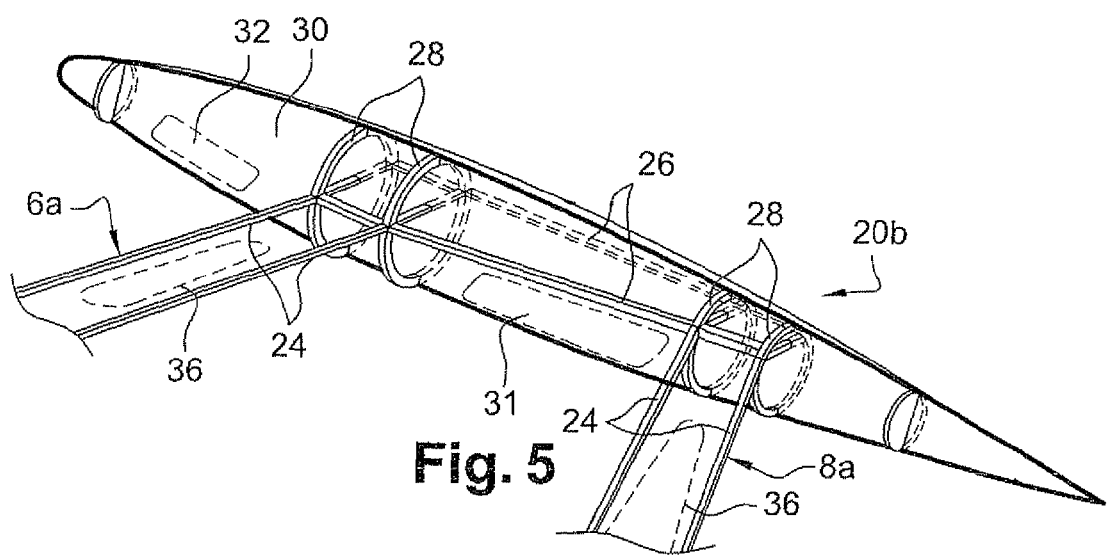
FIG. 5 is a perspective view in transparency showing one of the bodies of the FIG. 1 airplane.

As shown in FIG. 5, provision could be made for each body to form part of the structure of the aircraft. Thus, each body has a frame rigidly secured to the structure of the wings and in particular to their spars 24. In the present example, the frame of the body comprises two mutually parallel longerons 26 each fastened to the two spars 24 of the wings. Circular rings 28 on a common axis, four rings in this example, are fastened to the longerons 26 and support the box 30 of each body. Insofar as the bodies form part of the structure of the airplane, they are suitable for receiving and transmitting forces to contribute to the rigidity of the airplane.

Provision may be made for each of the bodies to include a fuel tank 31. Provision could even be made for each body to be in fluid flow communication with the wings so as to interconnect them and enable fuel to be exchanged between the tank in the body and tanks 36 in both of the wings. This thus makes it possible to transfer fuel between the two wings situated on the same side of the aircraft via the corresponding body. This option serves to limit excursions of the center of gravity of the airplane due to fuel being consumed in flight. It also facilitates managing the distribution of fuel on board. This management is also made easier, even if the bodies do not include tanks proper, providing they allow fuel to be transferred from one wing to the other.

Provision may be made for each body to constitute a volume that is available for receiving any type of system such as a navigation device, a communications device, or a detector device. More generally, the body may receive any electrical, electronic, or hydraulic device 32 (e.g. a hydraulic pump).

The bodies connect together the ends of the front and rear wings. As a result, they considerably improve the twisting and bending behavior of the wings. The structural design and shape of these bodies are preferably adapted to maximize these improvements. The presence of these bodies also improves the structural architecture of the airplane, thereby achieving a corresponding reduction in the weight of its structure.

In the present example, with a configuration in which the front wings are low and the rear wings are high, with the engines 12 being positioned under the rear wings, it can be seen that the front wings mask part of the noise transmitted upstream by the engines, in particular the noise generated by the inlet blades of their fans. At large angles of incidence, the front wings are observed to perform a flow-straightening effect that is favorable to the front to air intake by the engines.

The airplane may be a commercial airliner, for example.

Figure 6:
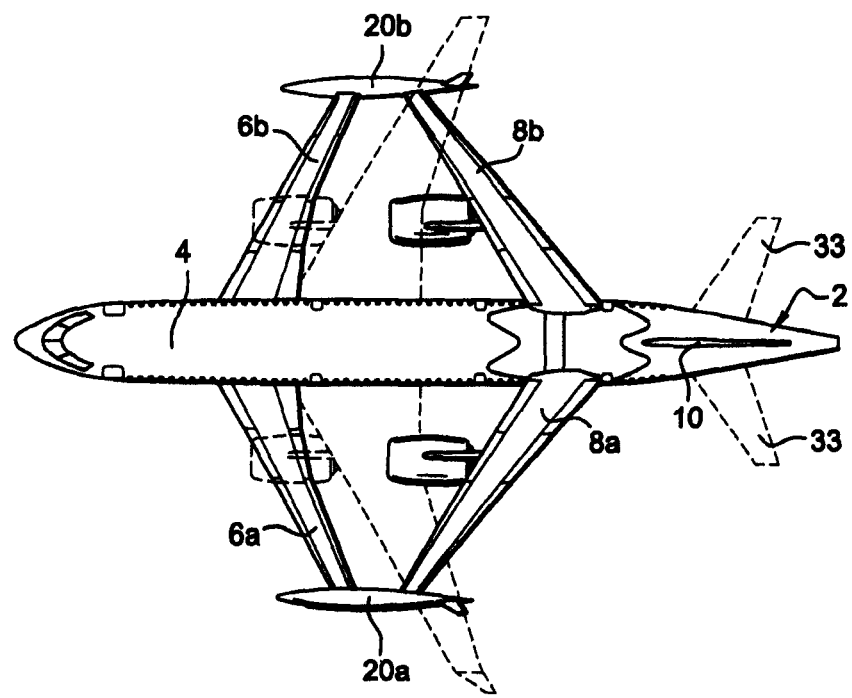
FIGS. 6 and 7 are a plan view and a front view of the FIG. 1 airplane shown superposed on an airplane with conventional wings, for comparison purposes.
Figure 7:
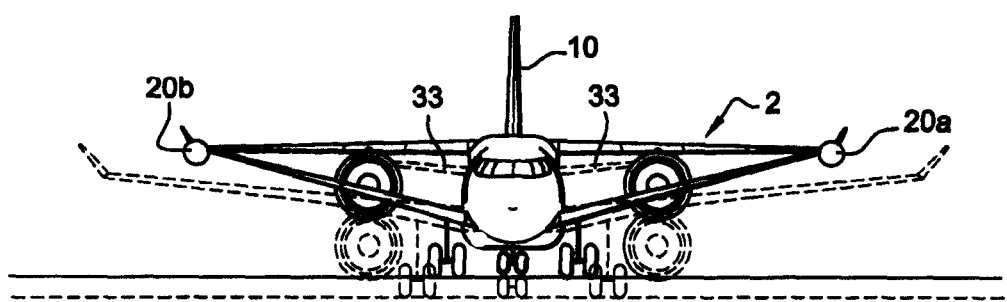

By way of comparison, FIGS. 6 and 7 show the general silhouette of the airplane 2 superposed on the silhouette of an airplane of conventional configuration, i.e. having only one pair of backwardly-swept wings. To make the comparison pertinent, the two airplanes are assumed to have comparable capacities. In FIG. 6 it can be seen that the wing span of the airplane 2 is smaller than that of the conventional airplane. FIG. 7 shows that the wings of the airplane 2 are higher than those of the conventional airplane. At its tail, the airplane of the invention has a (vertical) fin 10 like the conventional airplane, but unlike the conventional airplane it does not have a horizontal stabilizer nor any (horizontal) pitch controls 33.

Naturally, numerous modifications can be made to the invention without going beyond the ambit thereof.

More than two pairs of wings may be provided, with all or some of these pairs being connected together by the bodies.

Each body may be given a shape that is asymmetrical.

Unlike the example shown, provision may be made for the front wing to be attached to a high portion of the fuselage with the rear wing being attached to a low portion of the fuselage.

The engines may be positioned under or over the front wing or the rear wing.

The bodies may be attached to portions of the wings other than their distal ends.

What is claimed is:
1. An aircraft comprising:
a fuselage;
a front pair of wings;
a rear pair of wings; and a pair of bodies each body interconnecting at a distance from the fuselage, the front and rear wings that are situated on a same side of the fuselage, wherein each body includes at least one electrical, electronic, or hydraulic member, and wherein the bodies include respective fuel tanks, each body being in fluid communication with a fuel tank in both of the front and rear wings that are situated on the same side of the fuselage.

2. An aircraft according to claim 1, wherein each body is of streamlined shape.

3. An aircraft according to claim 2, wherein each body comprises a box.

4. An aircraft according to claim 1, wherein, on each body, the wing portions contiguous to the body are spaced apart from each other.

5. An aircraft according to claim 1, wherein each body includes at least one appendix.

6. An aircraft according to claim 1, wherein the bodies form portions of the structure of the aircraft.

7. An aircraft according to claim 1, wherein each body projects from the wings with which it is associated in at least one of the following directions:
forwards;
rearwards;
upwards;
downwards; and
away from the fuselage;
and in all of said directions.

8. An aircraft according to claim 1, wherein one of the pairs of wings, extends from a bottom zone of the fuselage and the other of the pairs of wings, extends from a top zone of the fuselage.

9. An aircraft according to claim 8, wherein the one of the pairs of wings is the front pair and the other of the pairs of wings is the rear pair.

10. An aircraft according to claim 1, wherein the at least one electrical, electronic or hydraulic member is selected from the group consisting of a navigation member, a communications member and a detector member.

* * * * *